United States Patent
Maginnis

(10) Patent No.: US 10,311,465 B2
(45) Date of Patent: Jun. 4, 2019

(54) ESTIMATING FOOT TRAFFIC LIFT IN RESPONSE TO AN ADVERTISEMENT CAMPAIGN AT AN ONLINE SYSTEM

(71) Applicant: Facebook, Inc., Menlo Park, CA (US)

(72) Inventor: Patrick Brendan Maginnis, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 286 days.

(21) Appl. No.: 14/742,509

(22) Filed: Jun. 17, 2015

(65) Prior Publication Data

US 2016/0371722 A1 Dec. 22, 2016

(51) Int. Cl.
*G06Q 30/02* (2012.01)

(52) U.S. Cl.
CPC ..... *G06Q 30/0243* (2013.01); *G06Q 30/0261* (2013.01)

(58) Field of Classification Search
CPC .................................. G06Q 30/0207–30/0277
USPC .............................................. 705/14.1–14.73
See application file for complete search history.

(56) References Cited

U.S. PATENT DOCUMENTS

| | | | |
|---|---|---|---|
| 2002/0052699 A1* | 5/2002 | Chen ......................... | D21F 7/04 702/34 |
| 2015/0286650 A1* | 10/2015 | Stump ..................... | G06Q 50/01 705/319 |
| 2015/0348095 A1* | 12/2015 | Dixon ................ | G06Q 30/0246 705/14.45 |

\* cited by examiner

*Primary Examiner* — Sam Refai
(74) *Attorney, Agent, or Firm* — Fenwick & West LLP

(57) ABSTRACT

An online system estimates a lift in foot traffic at a store in response to an advertisement campaign at the online system. The online system identifies a physical location for the store and obtains location data for a base group of users and a lifted group of users, where the lifted group of users receives advertisements associated with the store and the base group of users does not. The online system computes a distance between the location of the store and the user's location to create a base distance array for the base group and a lifted distance array for the lifted group. The online system then determines an aggregate value that represents a measure of a number of users visiting the store for each of the base distance array and the lifted distance array, and estimates a lift in foot traffic by comparing the two aggregate values.

30 Claims, 4 Drawing Sheets

ESTIMATING FOOT TRAFFIC LIFT IN RESPONSE TO AN ADVERTISEMENT CAMPAIGN AT AN ONLINE SYSTEM

BACKGROUND

This disclosure relates generally to estimating a lift in foot traffic at a store, and more particularly to estimating foot traffic lift at the store in response to an advertisement campaign at an online system.

Businesses often use behaviors of their customers to influence services provided to the customers. Businesses may provide advertisements to users at an online system to increase traffic to their stores. Any business that provides such advertisements may be interested in estimating a lift in foot traffic at a physical location of its stores in response to the advertisement campaign to measure the effectiveness of its advertisement campaign.

Conventional techniques for estimating foot traffic lift use direct measures of foot traffic such as tracking a number of visits to a store's physical location by estimating a number of users within a predefined region around the store's physical location. In such a technique, a user is counted as a visitor to a store if the user's device is detected to be within a predefined region around the physical location of the store. The accuracy of such a conventional technique depends on a frequency with which the user's device reports its location. For example, the accuracy of the foot traffic lift estimate increases as the reporting frequency increases. It is important for businesses with brick-and-mortar stores engaging in advertisement campaigns at online systems to be able to estimate foot traffic lift in response to such campaigns accurately irrespective of a frequency with which the user's device reports its location.

SUMMARY

To determine the effectiveness of an advertisement campaign at an online system, the online system estimates a lift in foot traffic at a store in response to the advertisement campaign. For example, the online system estimates the foot traffic lift by receiving location data associated with users in the vicinity of the store, and by determining an aggregate value based on the received location data. The aggregate value may be an indirect measure for a number of visitors to the store such as, for example, a mean distance between the store's physical location and the users' closest reported location to the store's physical location. The online system estimates the mean distance from the store for a base group of users (i.e., control group) that does not receive advertisements associated with the store, and for a lifted group of users (i.e., treatment group) that does receive one or more advertisements associated with the store. The online system then estimates a lift in foot traffic by computing a decrease in the mean distance from the store for the base group of users versus the lifted group of users, where any decrease in the mean distance from the base group to the lifted group represents a lift in foot traffic at the store in response to the advertisement campaign. Foot traffic in the context used throughout this description refers to in-person visits by users (e.g., by foot) to a physical or brick and mortar location of a store/brand associated with an advertiser or entity that owns the store/brand).

To estimate a lift in foot traffic in response to the advertisement campaign associated with a store, the online system identifies a physical location of the store or brand. The online system obtains location data of users corresponding to the base group of users and to the lifted group of users. To compute a mean distance from the store for each of the base group and lifted group of users, the online system computes a distance between the obtained location associated with a user and the physical location of the store for each user of the base group to create a base distance array, and for each user of the lifted group of users to create a lifted distance array. For the base group of users and the lifted group of users with a number of users K, each of the base distance array and the lifted distance array includes K distances. The online system determines a mean distance value for each of the base distance array and the lifted distance array, where the mean distance value is an aggregate value that represents an indirect measure of a number of users visiting the store. Other example aggregate values may relate to other statistical values of distance such as standard deviation, median, Z-score, and the like.

In one embodiment, the online system determines the mean distance value for a distance array using statistical techniques such as bootstrapping with replacement statistical analysis. Bootstrapping is a statistical technique that uses resampling to estimate any statistic of a population. The bootstrapping technique is used to compute statistics on mean distance value for each of the base distance array and the lifted distance array. The technique includes generating a first sample of the distance array and then generating multiple distance sub-arrays by resampling the first sample, where each distance sub-array is of the same length as that of the first sample. The online system computes a mean distance value for each of the multiple distance sub-arrays and generates a mean distance array comprising the mean distance values of the multiple distance sub-arrays. The online system then orders the individual mean distance values of the mean distance array in either an ascending order or a descending order for further processing. A mean distance value is determined for the distance array using a confidence interval such as a 95% confidence interval.

The online system estimates a lift in the foot traffic at the store by computing a difference between the mean distance value for the lifted distance array and the mean distance value for the base distance array, where the mean distance value difference represents a measure of the increase in the number of users visiting the store in response to receiving the advertisement. Statistical analysis such as a proportion test and Z-score computation, as described below with reference to FIG. 3, can be performed on the mean distance values for the base group of users and the lifted group of users to estimate whether any higher rate of visitors observed with the lifted group (i.e., any reduction in mean distance) is statistically significant.

In one embodiment, the online system estimates the lift in foot traffic for each set of users belonging to a frequent reporting group, where the users' client devices report their location data frequently to the online system (e.g., above a frequency threshold), and belonging to an infrequent reporting group, where the users' client devices do not report their location data frequently enough to the online system (e.g., below a frequency threshold). For example, the users of frequent reporting group might have opted in to location tracking such that the online system may obtain the location data associated with the user (i.e., the current location of the device) even when a mobile application is running in the background on the mobile device, such that the device has an ability to share the device's location periodically without any input from the user. Alternatively, the users of the infrequent reporting group might have opted out of location tracking such that the online system may obtain the location data associated with the user only when a mobile application is running in the foreground, and the user provides an input to share the device's location. The proportion test analysis and Z-score computation can be repeated for each of the frequent reporting group and infrequent reporting group, and individual Z-scores can be combined using Stouffer's weighted Z-score method.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

System Architecture

Figure 1:
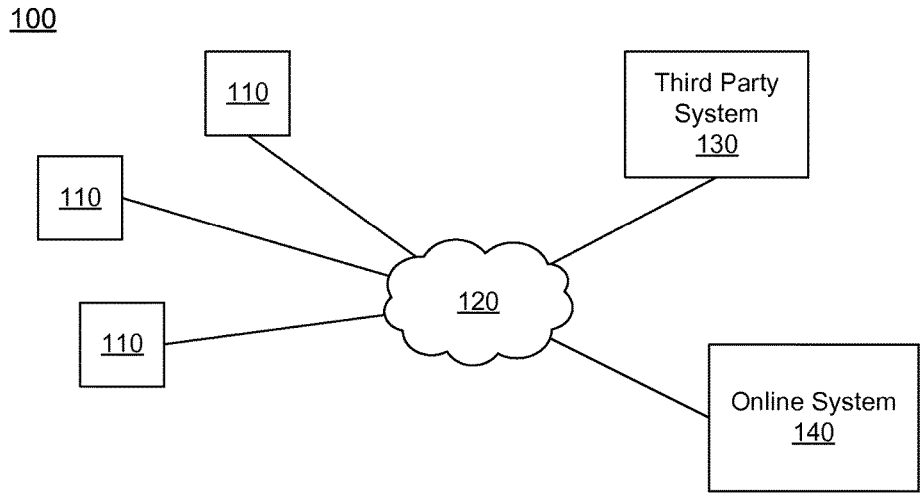
FIG. 1 is a block diagram of a system environment in which an online system operates, in accordance with an embodiment.

FIG. 1 is a block diagram of a system environment 100 for an online system 140 such as, a social networking system. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. In some embodiments, the client devices 110 include location tracking functionality, and can identify the locations of the devices based on global positioning, IP address, triangulation to nearby cellular towers, or any other mechanism. In one embodiment, a user of the client device 110 can disable or opt out of location tracking on the device, and the client device 110 will not track the device's location. In other cases, the client device 110 only tracks location if the user opts in to location tracking.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Figure 2:
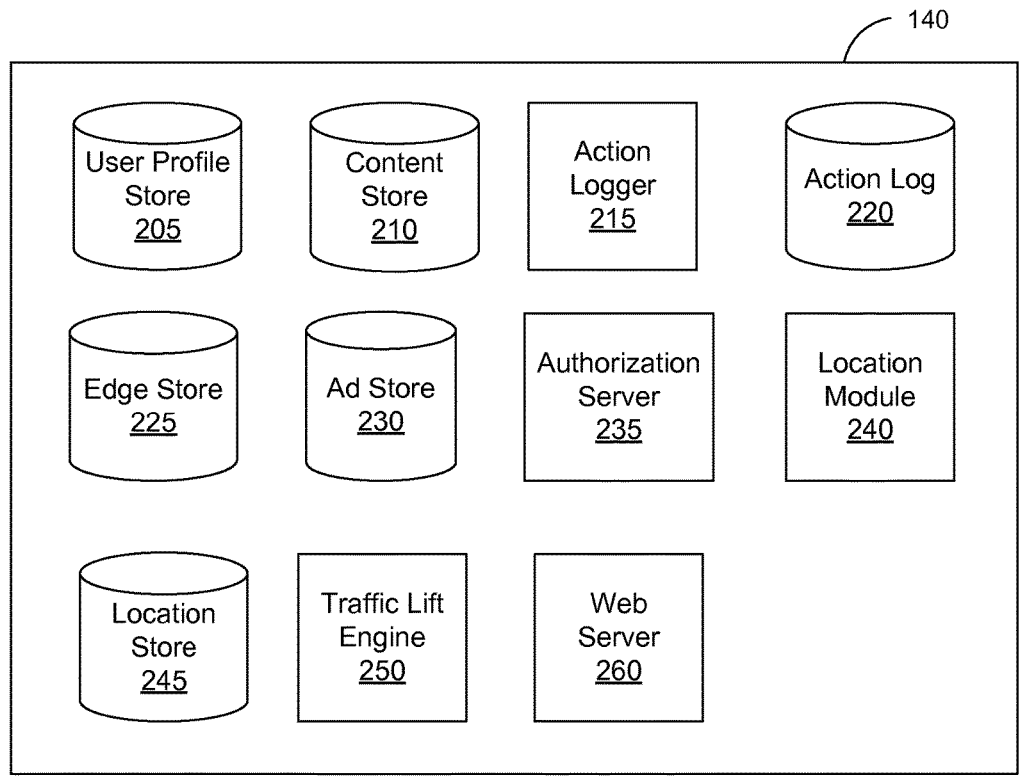
FIG. 2 is a block diagram of an online system, in accordance with an embodiment.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130. Other third party systems 130 are associated with entities having physical locations that may be visited by users of the online system 140. For example, third party system 130 may be associated with an entity that has brick-and-mortar businesses selling merchandise to users of the online system 140.

An example system operating as the online system 140 is a social networking system. FIG. 2 is an example block diagram of an architecture of the online system 140 including social networking functionality. The online system 140 shown in FIG. 2 includes a user profile store 205, a content store 210, an action logger 215, an action log 220, an edge store 225, an ad store 230, an authorization server 235, a location module 240, a location store 245, a traffic lift engine 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged or stored in the user profile of the user. A user profile in the user profile store 205 may also maintain references to actions by the corresponding user performed on content items in the content store 210 and stored in the action log 220. Furthermore, a user profile in the user profile store 205 may also store identifiers of physical locations visited by the corresponding user.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. Brands for which foot traffic advertising lift is calculated for one or more brick and mortar stores may have a brand page representing an online presence for the brand within the online system 140. Each store can also have a separate brand page.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells apparel at bargain prices may recognize a user of an online system 140 through a social plug-in enabling the e-commerce website to identify the user of the online system 140. Because users of the online system 140 are uniquely identifiable, e-commerce websites, such as in the apparel retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad store 230. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the online system 140 if the advertisement is presented to a user, if the advertisement receives a user interaction, or based on any other suitable condition. For example, the bid amount specifies a monetary amount that the online system 140 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with content in the advertisement request. For example, targeting criteria are a filter to apply to fields of a user profile, edges, and/or actions associated with a user to identify users having user profile information, edges, or actions satisfying at least one of the targeting criteria. Hence, the targeting criteria allow an advertiser to identify groups of users matching specific targeting criteria, simplifying subsequent distribution of content to groups of users.

In one embodiment, the targeting criteria may specify actions or types of connections between a user and another user or object of the online system 140. The targeting criteria may also specify interactions between a user and objects performed external to the online system 140, such as on a third party system 130. For example, the targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in the targeting criteria allows advertisers to further refine users eligible to be presented with content from an advertisement request. As another example, targeting criteria may identify users having a connection to another user or object or having a particular type of connection to another user or object. Furthermore, targeting criteria may also specify a location visited by a user. For example, the targeting criteria identifies a city, building, or room in which the user is or was located.

The authorization server 235 enforces one or more privacy settings of the users of the online system 140. A privacy setting of a user determines how particular information associated with a user can be shared, and may be stored in the user profile of a user in the user profile store 205 or stored in the authorization server 235 and associated with a user profile. In one embodiment, a privacy setting specifies particular information associated with a user and identifies the entity or entities with whom the specified information may be shared. Examples of entities with which information can be shared may include other users, applications, third party systems 130 or any entity that can potentially access the information. Examples of information that can be shared by a user include user profile information like profile photo, phone numbers associated with the user, user's connections, actions taken by the user such as adding a connection, changing user profile information, locations visited by the user, and the like.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems 130, specific third party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The authorization server 235 includes logic to determine if certain information associated with a user can be accessed by a user's friends, third-party system 130 and/or other applications and entities. For example, a third-party system 130 that attempts to access a user's comment about a uniform resource locator (URL) associated with the third-party system 130 must get authorization from the authorization server 235 to access information associated with the user. Based on the user's privacy settings, the authorization server 235 determines if another user, a third-party system 130, an application or another entity is allowed to access information associated with the user, including information about actions taken by the user. For example, the authorization server 235 uses a user's privacy setting to determine if the user's comment about a URL associated with the third-party system 130 can be presented to the third-party system 130 or can be presented to another user. This enables a user's privacy setting to specify which other users, or other entities, are allowed to receive data about the user's actions or other data associated with the user.

The location module 240 determines locations of a client device 110 and stores the locations in a user's user profile. If the user of the client device 110 has opted in to location tracking, the location module 240 accesses the location determined by the client device 110 to determine a current physical location of the device. In one embodiment, the location module 240 periodically (e.g., every 15 minutes) samples locations of the client device 110 and stores the locations in the user's user profile. Additionally or alternatively, the location data of the client device is stored at the location store 245. The location module 240 may retrieve the device's location from any location-sensing capabilities of the client device 110, including, for example, GPS, IP address, and cell phone tower triangulation.

In one embodiment, the location module 240 is configured to convert the raw location data received from a client device 110 to an entity or object of interest, which is determined to be a location visited by a user. For example, the location module 240 may access map data to identify, by reverse geocoding, an address corresponding to a location received from a client device 110. The address may include a street address, a city, a county, a state, and/or a country. The location module 240 may also identify a name of an entity at the address. For example, the location module 240 identifies an address visited by a user of a client device 110 as being an address of a store, and determines the name of the store at the address. For locations within a building (e.g., departments within a department store), the location module 240 may access map data provided by an entity associated with the building that converts locations received from a client device 110 to locations within the building. Thus, the location module 240 may define locations visited by users at a variety of different granularities, including cities, buildings, and locations within buildings. Furthermore, by converting raw location data to an entity or object of interest, the location module 240 aggregates samples of the location of a user device 110 collected from the same location.

Based on a number of samples collected at the same location, the location module 240 may determine an amount of time the user spent at the location. In one embodiment, the location module 240 stores locations visited by a user in the location store 245 (as an address, raw location data as received from the client device 110, or both) in association with a time stamp, an amount of time spent at the location, and a user identifier of the user.

The traffic lift engine 250 estimates a lift in foot traffic at a store in response to an advertisement campaign at the online system 140. The traffic lift engine 250 obtains a location for a store from the location store 245, where the store is associated with the advertisement campaign at the online system 140. The store may represent a brick-and-mortar business that sells merchandise to consumers. The traffic lift engine 250 obtains location data of users from location store 245 and/or user profile store 205. The traffic lift engine 250 obtains location data of users corresponding to a base group of users that does not receive any advertisements associated with the store, and corresponding to a lifted group of users that does receive one or more advertisements associated with the store.

The traffic lift engine 250 computes a distance between the obtained location associated with a user and the location of the store, for each user of the base group to create a base distance array, and of the lifted group of users to create a lifted distance array. For a base group of users and a lifted group of users with a number of users K, each of the base distance array and the lifted distance array includes K distances. The traffic lift engine 250 determines an aggregate value for each of the base distance array and the lifted distance array, where the aggregate value represents a measure of a number of users visiting the store. In one embodiment, the aggregate value of a distance array is a mean distance value of the distance array representing an average value of the distance between the physical location of the store and location data corresponding to each user of the distance array. Alternatively, aggregate value may relate to other statistical values of distance such as, for example, standard deviation, median, Z-score, and the like.

The traffic lift engine 250 determines the mean distance value for a distance array using statistical techniques such as bootstrapping with replacement statistical analysis. The bootstrapping technique is used to compute statistics on mean distance value for each of the base distance array and the lifted distance array. The technique includes generating a first sample of the distance array and then generating multiple distance sub-arrays by resampling the first sample, where each distance sub-array is of the same length as that of the first sample. The traffic lift engine 250 computes a mean distance value for each of the multiple distance sub-arrays and generates a mean distance array comprising the mean distance values of the multiple distance sub-arrays. Then the traffic lift engine 250 orders the individual mean distance values of the mean distance array in either an ascending order or a descending order for further processing. The traffic lift engine 250 determines a mean distance value for the distance array using a confidence interval such as a 95% confidence interval or another interval (e.g., 90%, 96%, 98%, 99.5%, etc.).

The traffic lift engine 250 estimates a lift in the foot traffic at the store by computing a difference between the mean distance value for the lifted distance array and the mean distance value for the base distance array, where the mean distance value difference represents a measure of the increase in the number of users visiting the store in response to receiving the advertisement. Statistical analysis such as a proportion test and Z-score computation, as described below with reference to FIG. 3, can be performed on the mean distance values for the base group of users and the lifted group of users to estimate whether any higher rate of visitors observed with the lifted group (i.e., any reduction in mean distance) is statistically significant.

In one embodiment, the traffic lift engine 250 estimates the lift in foot traffic for each set of users belonging to a frequent reporting group, where the users' client devices report their location data frequently to the online system, and belonging to an infrequent reporting group, where the users' client devices do not report their location data frequently enough to the online system. For example, the users of frequent reporting group might have opted in to location tracking such that the traffic lift engine 250 may obtain the location data associated with the user (i.e., the current location of the device) even when a mobile application is running in the background on the mobile device, such that the device has an ability to share the device's location periodically without any input from the user. Alternatively, the users of the infrequent reporting group might have opted out of location tracking such that the traffic lift engine 250 may obtain the location data associated with the user only when a mobile application is running in the foreground, and the user provides an input to share the device's location. The proportion test analysis and Z-score computation can be repeated for each of the frequent reporting group and infrequent reporting group, and individual Z-scores can be combined using Stouffer's weighted Z-score method.

The web server 255 links the online system 140 via the network 120 to the one or more client devices 110, as well as to the one or more third party systems 130. The web server 255 serves web pages, as well as other content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or BlackberryOS.

Example Representation of Foot Traffic at a Store

FIGS. 3A-3F show example representations of foot traffic at a store, in accordance with an embodiment. There may be direct and indirect measures for estimating foot traffic and foot traffic lift due to an advertisement campaign. An example direct measure may relate to detecting a location of a user (e.g., through a client device 110 associated with the user) and determining that user visited the store if the detected location is within a boundary of a store's physical location. An example indirect measure may relate to receiving location data of users' client devices 110 while the users are in the vicinity of the store and performing statistical analysis on the received data. The results from the statistical analysis can then be used to estimate foot traffic at the store, and foot traffic lift due to an advertisement campaign at the online system 140. In one embodiment, statistical analysis can be performed to calculate a mean distance of a group of users in the vicinity of the store and determine whether the mean distance of the group reduces as a result of the advertisement campaign, where the mean distance is an indirect measure of the foot traffic and a reduction in the mean distance in response to the advertisement campaign provides an indication of foot traffic lift. An example process of estimating foot traffic lift using statistical analysis is described below with reference to FIG. 4.

Figure 3A:
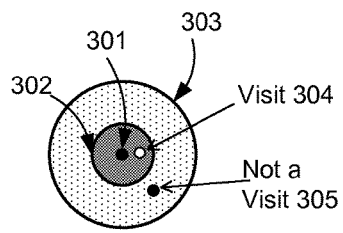
FIGS. 3A-3F show example representations of foot traffic at a store, in accordance with an embodiment.

FIG. 3A shows an example representation of a visit by a user at a physical location of a store. A visit by a user at a physical location of the store may be determined by detecting a location of the user's client device (e.g., client device 110 such as a smart phone) within a pre-defined area associated with the physical store location. For example, a store has a physical location that may be represented with a set of GPS coordinates (e.g., latitude and longitude coordinates). An example physical location of a store is represented as location 301 in FIG. 3A. An example pre-defined area associated with the physical store location 301 of the store is represented by a shaded circular region 302 in FIG. 3A such that when a location of a user's client device 110 is detected within the pre-defined area 302, the user is considered to have visited the store. For example, a user's client device 110 is detected within the pre-defined area 302 at location 304 such that the user is considered to be a visitor to the store. If a location of the user's client device 110 is detected outside of the pre-defined area 302, the user is considered to not have visited the store. For example, an additional user's client device 110 is detected at a location 305 that is outside of the pre-defined area 302 (e.g., area between the circular regions of 302 and 303) such that the additional user is not a visitor to the store. The example areas 302 and 303 may be configured based on the size of the store. For example, as the size of the store increases, a radius of an example circular area 302 may also increase.

Figure 3B:
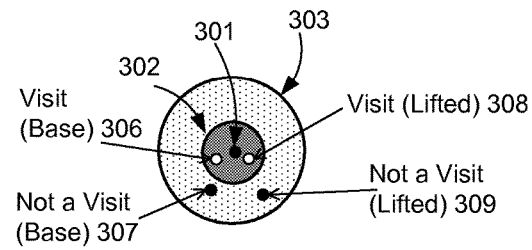
Figure 3C:
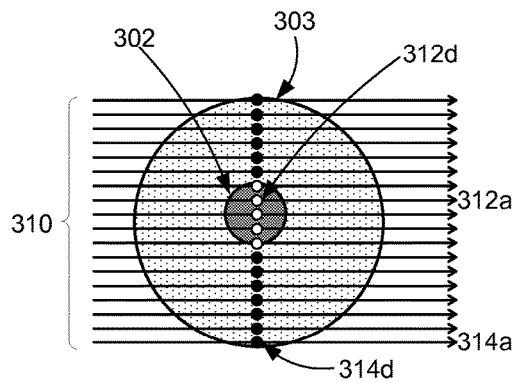

An estimation of a lift in foot traffic at a physical store in response to an advertisement campaign requires determining a number of visitors from a base group (i.e., control group) and determining a number of visitors from a lifted group (i.e., treatment group), where the base group does not receive advertisements related to the store and the lifted group receives one or more advertisements related to the store. Users are randomly placed in either the base group or lifted group of users. FIG. 3B shows an example representation of visits by users in both the base group of users and the lifted group of users at the store. The example physical location of the store 301, the pre-defined area 302 representing an area within which the user is considered a visitor to the store, and also the pre-defined area 303 of FIGS. 3B, 3C, and 3E are same as described above with reference to FIG. 3A. The dot 306 represents a detected location of a first user's client device 110 within the area 302, where the first user is part of the base group of users. The dot 307 represents a detected location of a second user's client device 110 outside the area 302, where the second user is also part of the base group of users. The dot 308 represents a detected location of a third user's client device 110 within the area 302, where the third user is part of the lifted group of users. The dot 309 represents a detected location of a fourth user's client device 110 outside the area 302, where the fourth user is also part of the base group of users.

A factor in being able to record a user's visits to a store is the frequency with which the user's client device reports its location to the online system 140. For example, if the user of the client device 110 has opted in to location tracking, the location module 240 accesses the location determined by the client device 110 to determine a current location of the device. In one embodiment, the location module 240 periodically (e.g., every 15 minutes) samples locations of the client device 110 and sends them to the online system 140. If the location reporting frequency is high enough (e.g., above a threshold, such as once every 15 minutes) as with the frequent reporting group of users, the online system 140 will likely receive information of all visits by a user to a particular physical location of a store. If, on the other hand, when the user has not opted in for location tracking or if the location reporting frequency is not high enough (e.g., below a threshold, such as once every hour) as with the infrequent reporting group of users, the online system 140 might not be able to accurately receive at least some visits to the store where the user does not spend a significant amount of time at the store. For example, if the location reporting frequency is once every hour, the online system 140 might not receive the user's visits when the user spends less than one hour at the store. In other words, the online system 140 might not get an accurate measure of the users' visits especially in the scenario where the location reporting frequency is not high enough. Additionally, the online system 140 might also not get an accurate measure of the users' visits when the user has not opted in for location tracking because the online system 140 receives information about only those visits where the user chooses to check in the actual location of the client device 110. Accordingly, a direct measure for estimating a number of visits to a store such as determining whether the user's client device 110 is within a pre-defined area of the store might underreport the actual number of visitors to the store. In one embodiment, as the location reporting frequency increases, the accuracy of estimating a number of visits to a store also increases. An example illustration of the underreporting of the actual number of visitors to the store is shown in FIGS. 3C through 3F.

FIG. 3C shows an example representation of locations reported by client devices 110 of users in the vicinity of the store, where the users belong to the frequent reporting group such that all visits by the users to the store are actually received and recorded at the online system 140. Each arrow of the set of arrows 310 shown in FIG. 3C represents a path that a user takes while walking around the area in the vicinity (e.g., includes areas 302, 303, and beyond) of the physical location 301 of the store. Each dot within each arrow represents a reported location of the user's client device that is closest to the store's physical location 301. For example, dot 312d represents a reported location of a user corresponding to arrow 312a that is closest to the store location 301, which happens to be within the pre-defined area 302. Dot 314d represents a reported location of a user corresponding to arrow 314a that is closest to the store location 301, which happens to be outside of the pre-defined area 302 and at the edge of the periphery of area 303.

Figure 3D:
Figure 3E:
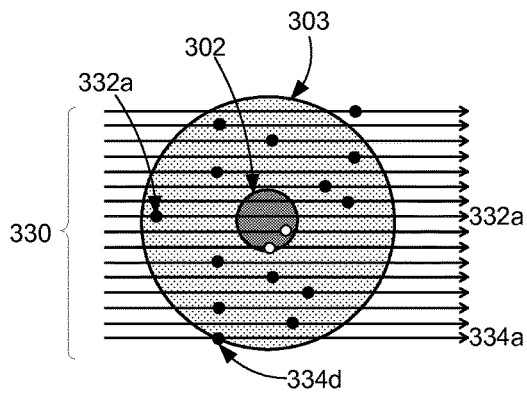

FIG. 3D shows another representation of a number of reported users as a function of a distance of the user's closest location to the physical location of the store, where the users' visits of FIG. 3D correspond to the users' visits shown in FIG. 3C. The X-axis of FIG. 3D represents a distance between the store location 301 and the user's closest reported location to the store's location 301 (e.g., each dot on the set of arrows 310). The Y-axis of FIG. 3D represents a number of reported users at a given distance from the store's physical location 301. Because FIG. 3C shows the number of reported locations of users' client devices 110 that is constant as a distance between the location of the client devices 110 and the store location 301, the vertical bars representing number of reported client devices 110 of users at a given distance to the store's location 301 are also constant at various distances on the X-axis. For example, vertical bar 322 corresponding to client devices 110 that are close to the store location 301 represents the same number of reported users as vertical bar 324 corresponding to client devices 110 that are farther from the store location 301.

FIG. 3E shows a representation of locations reported by client devices 110 of users in the vicinity of the store, where the users belong to the infrequent reporting group such that all visits by the users to the store are not necessarily received and recorded at the online system 140. The underlying number of visits to the store by users is same for both representations of FIGS. 3C and 3D, and the only difference is the location reporting frequency, where the frequency is not high enough for FIG. 3E to be able to receive and record all visits to the store. In other words, the reported locations of the client devices 110 shown in FIGS. 3C and 3E are actually the same except that the location data shown in FIG. 3C corresponds to users when they belong to the frequent reporting group and the location data shown in FIG. 3E corresponds to users when they belong to the infrequent reporting group.

Each arrow of the set of arrows 330 shown in FIG. 3E, similar to arrows 310 of FIG. 3C, represents a path that a user takes while walking around the area in the vicinity (e.g., includes areas 302, 303, and beyond) of the physical location 301 of the store. Each dot within each arrow represents a reported location of the user's client device that is closest to the store's physical location 301. Because the location reporting frequency is not high enough, the closest reported location of a client device 110 is not necessarily the actual closest location of the client device while the corresponding user is walking around the area in the vicinity of the store. For example, dot 332d represents a reported location of a user corresponding to arrow 332a that is closest to the store location 301, which happens to be outside of the pre-defined area 302. Arrow 332a of FIG. 3E corresponds to the same user associated with arrow 312a shown in FIG. 3C, and similarly dot 334d of FIG. 3E corresponds to the same user associated with dot 314d of FIG. 3C. Even though the closest actual location of the client device 110 associated with the user corresponding to arrow 332a and dot 332d is a location represented by dot 312d of FIG. 3C, the closest reported location when the user belongs to the infrequent reporting group is a location represented by dot 332d, which is much farther away from the store's location 310 than that of dot 312d. That is, the closest reported location corresponding to the infrequent reporting group might not be the actual closest physical location that a user traverses to and accordingly, the accuracy of estimating a number of visitors as represented by a number of reported users as a function of a distance of the user's closest location to the physical location of the store is lower than that of the frequent reporting group of FIG. 3C. A loss of accuracy corresponding to the infrequent location reporting scenario is represented by an example representation of FIG. 3F.

Figure 3F:
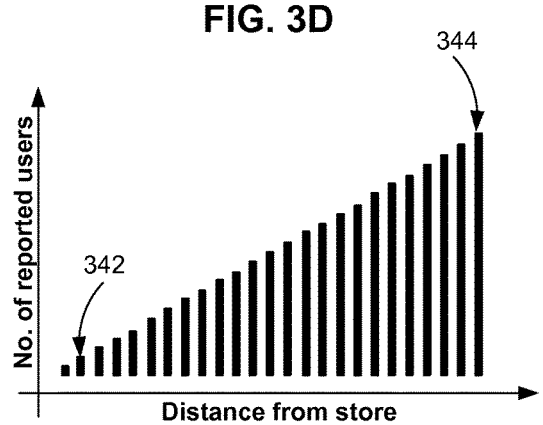

FIG. 3F shows a representation of a number of reported users as a function of a distance of the user's closest location to the physical location of the store. The X-axis of FIG. 3F represents a distance between the store location 301 and the user's closest reported location to the store's location 301 (e.g., each dot on the set of arrows 330). The Y-axis of FIG. 3D represents a number of reported users at a given distance from the store's physical location 301. Because FIG. 3E likely under reports the number of actual visits to the store because of infrequent location reporting by the client devices 110, the vertical bars representing a number of reported locations of users' client devices 110 also under report the actual number of visitors to the store. For example, the number of reported client devices increases as a function of distance from the store's physical location 301 because the reported closest location for some client devices 110 is farther than the actual closest location as described above with reference to FIG. 3E. Accordingly, a direct measure of counting the number of visitors based on whether the closest reported location of the client device 110 is within a boundary of the store's physical location might not result in an accurate estimate in foot traffic and any lift in the foot traffic in response to an advertisement campaign especially when including an infrequent reporting group of users. An example process of estimating foot traffic lift using an indirect measure such as performing statistical analysis on closest reported location of the client devices 110 is described below with reference to FIG. 4, which provides improved accuracy for estimating a lift in foot traffic even when including an infrequent reporting group of users.

Statistical analysis such as a proportion test can be performed on the base group of users and the lifted group of users to estimate whether any higher rate of visitors observed with the lifted group is statistically significant. In an example proportion test between the base group and the lifted group of users, a Z-score can be computed for the data from the base and lifted groups to find out whether the Z-score is over 1.96, which represents that there is a 5% chance of seeing a result this high randomly. Z-score is a measure of standard deviation. The actual visitors to the store will comprise users that belong to either the frequent reporting group or the infrequent reporting group. The proportion test analysis and Z-score computation can be repeated for each of the frequent reporting group and infrequent reporting group. After computing Z-scores for each of the frequent reporting group and infrequent reporting group, the individual Z-scores can be combined to find out whether the there is a lift in the foot traffic for the overall users (that includes frequent reporting group and infrequent reporting group) as a result of the advertisement campaign. An example method of combining Z-scores is Stouffer's weighted Z-score method. The process of computing individual Z-scores for each of the frequent reporting group and infrequent reporting group, and then combining to result in an overall Z-score can be used on either a direct measure such as counting a number of visitors to the store or on an indirect measure such as estimating a mean distance of the users to the store.

Figure 4:
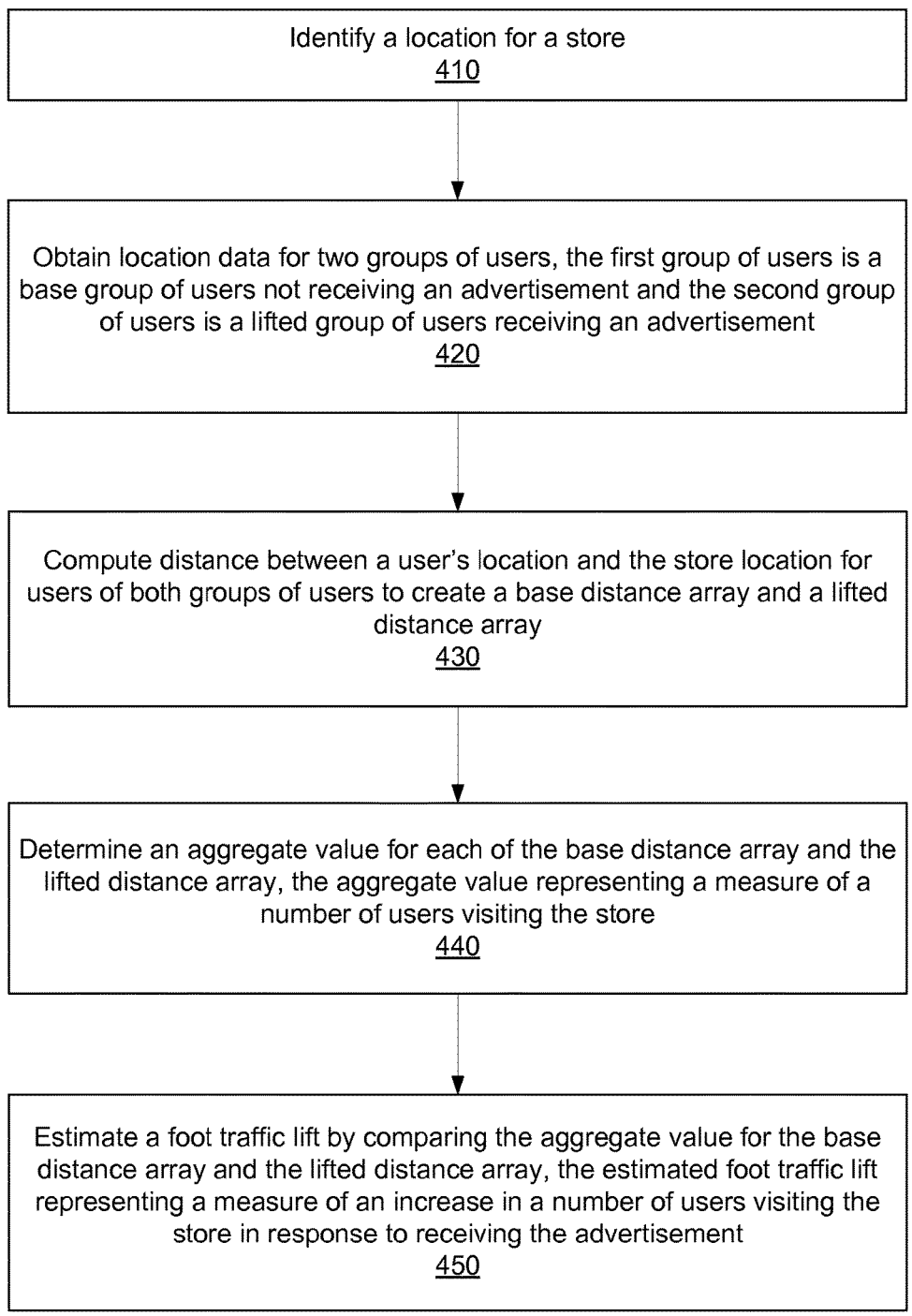
FIG. 4 is flowchart of an example process for estimating foot traffic lift at a store in response to advertisement campaign at an online system, in accordance with an embodiment.

Estimating Foot Traffic Lift at a Store in Response to Advertisement Campaign at an Online System FIG. 4 is flowchart of an example process for estimating foot traffic lift at a store in response to advertisement campaign at an online system, in accordance with an embodiment. In one embodiment, the online system 140 estimates a lift in foot traffic for each of the frequent reporting group of users and the infrequent reporting group of users, where the process of estimating foot traffic lift is described below with reference to FIG. 4 and is identical for each group of users. In some embodiments, the process may include different or additional steps than those described in conjunction with FIG. 4. Additionally, in some embodiments, the steps of the method may be performed in different orders than the order described in conjunction with FIG. 4.

The online system 140 identifies 410 a location for a store, where the store is associated with the advertisement campaign at the online system 140. For example, the online system 140 identifies a physical location for the store. In one embodiment, the store represents a brick-and-mortar business that sells merchandise to consumers.

The online system 140 obtains 420 location data of users to estimate a lift in foot traffic at a store in response to an advertisement campaign. The online system 140 estimates a lift in foot traffic at a store by estimating an increase in the number of visitors to the store in response to the advertisement campaign. In one embodiment, estimating the lift in foot traffic includes estimating foot traffic for a base group of users that does not receive any advertisements associated with the store, and for a lifted group of users that does receive one or more advertisements associated with the store. In this example embodiment, the online system 140 obtains location data for each of the base group of users and the lifted group of users.

In one embodiment, the online system 140 obtains the location data of a user from a mobile device (e.g., client device 110) associated with the user. For example, the mobile device can report its current location to the online system 140. In one embodiment, the online system 140 receives location data from the mobile device periodically (e.g., every 15 minutes). For example, if the user of the mobile device has opted in to location tracking, the location module 240 of the online system 140 may receive the location data associated with the user (i.e., the current location of the device) and stores the location data at the user's user profile store 205 and/or the location store 245. An example scenario occurs when the user has opted in to location tracking and shares the device's location even when a mobile application is running in the background on the mobile device, such that the device has an ability to share the device's location periodically to the online system 140 without any input from the user.

Alternatively, the online system 140 receives the location data from the mobile devices in response to certain user interactions such as foregrounding the mobile application or receiving an input provided by the users of the mobile devices, where the input provided by the users of the mobile devices provides an indication to share the location data of the mobile devices with the online system 140. For example, if the user of the mobile device has opted out of location tracking, the location module 240 of the online system 140 may receive the location data associated with the user (i.e., the current location of the device) only after the user provides an input that indicates that the user is willing to share the device's location with the online system 140. An example scenario occurs when the user has opted out of location tracking and shares the device's location when a mobile application is running in the foreground. Another example scenario occurs when the user has opted out of location tracking, and shares the device's location when the mobile application is running in the foreground and the user provides an input to share the device's location.

In one embodiment, the online system 140 estimates foot traffic lift at a store in response to advertisement campaign for each of two sets of lifted group of users, where the first set of lifted group of users is a lifted group of users corresponding to a frequent reporting group and the second set of lifted group of users is a lifted group of users corresponding to an infrequent reporting group. For example, the first set of lifted group of users is a set of users that opted into location reporting and their devices report their location data periodically (e.g., every 10 minutes) to the online system 140. Another example of the first set of lifted group of users is a set of users that opted into location reporting and their devices report their location data automatically without an input from their users. And the second set of users is, for example, a set of users that opted out of (or did not opt in) location reporting such that their devices report their location data to the online system 140 only when the user provides an input to indicate that the user would like to share the device's location. The example embodiment described herein is applicable to both the first set of lifted group of users and the second set of lifted group of users.

The online system 140 computes 430 a distance between a location associated with a user and the location of the store, for each user of each of the base group and lifted group of users. For example, the online system 140 computes 430 a distance between the store's physical location and the obtained location data associated with each user of the base group to create a base distance array. The online system 140 computes 430 a distance between the store's physical location and the obtained location data associated with each user of the lifted group of users to create a lifted distance array. The user's location for each user of the base group of users and the lifted group of users is determined from the obtained location data corresponding to the user. For a base group of users and a lifted group of users with a number of users K, each of the base distance array and the lifted distance array includes K distances. Example distance value may include 350 meters, 380 meters, 267 meters, and the like.

The online system 140 determines 440 an aggregate value for each of the base distance array and the lifted distance array, where the aggregate value represents a measure of a number of users visiting the store. In one embodiment, the aggregate value of a distance array is a mean distance value of the distance array representing an average value of the distance between the physical location of the store and location data corresponding to each user of the distance array. Alternatively, aggregate value may relate to other statistical values of distance such as, for example, standard deviation, median, Z-score, and the like. While the embodiments herein describe estimating a lift in foot traffic with respect to a mean distance value, it is understood that the method described in those embodiments is not limited to mean distance value but also extends to other statistical values of distance such as, but not limited to, standard deviation, Z-score, and median.

In one embodiment, the online system 140 determines the mean distance value for a distance array using bootstrapping with replacement statistical analysis. Bootstrapping involves sampling a population, measuring a statistic of the sample, and then using the statistic for inferring something about the corresponding parameter of the population. Sampling can be done in a couple of different ways depending on what is done to an object after the object is selected and recorded with a measurement of the attribute being studied. One option is to replace the object into the population being sampled, and another option is to not replace the object into the population being sampled. In the currently described embodiment, sampling (and resampling) used in the bootstrapping technique is performed with replacement.

The bootstrapping technique can be summarized as follows. Suppose it is possible to draw repeated samples (of the same size) from a population of interest, where the samples are drawn a large number of times. Sampling the population repeatedly a large number of times results in a fairly good idea about the sampling distribution of a particular statistic (e.g., mean distance between the store location and the users) from the collection of its values arising from these repeated samples. But sampling repeatedly a large number of times is typically too expensive and might even defeat the purpose of a sample study of the population, which is to gather information cheaply and in a timely fashion. The idea behind bootstrapping is to use the data of a sample study at hand as a surrogate of the population, for the purpose of approximating the sampling distribution of a statistic; i.e. to resample (with replacement) from the sample data at hand and create a large number of "phantom samples" known as bootstrap samples. The sample summary is then computed on each of the bootstrap samples (e.g., a few thousand). A histogram of the set of these computed values is referred to as the bootstrap distribution of the statistic.

The bootstrapping technique is used to compute statistics on mean distance value for each of the base distance array and the lifted distance array. In one embodiment, determining the mean distance value for each of the base distance array and lifted distance array using bootstrapping with replacement statistical analysis comprises generating a first sample of the distance array by sampling the distance array. For example, each distance array of length K is randomly sampled to generate the first sample of length N, where the length N is smaller than or equal to the length K of the distance array. The length N is typically chosen to be a large enough number such that the first sample is a fair representation of the distance array.

The online system 140 generates multiple distance sub-arrays by resampling the first sample, where each distance sub-array also comprising of the same length N as that of the first sample. The number of multiple distance sub-arrays (e.g., M sub-arrays) that are generated can vary from few tens of sub-arrays to hundreds and even thousands of sub-arrays. The accuracy of the bootstrapping technique can be improved by increasing the number of sub-arrays (i.e., M) generated. In one embodiment, the online system 140 computes a mean distance value for each of the multiple distance sub-arrays. The online system 140 generates a mean distance array comprising the mean distance values of the multiple distance sub-arrays. For example, M number of sub-arrays would result in a mean distance array of length M. The online system 140 orders the individual mean distance values of the mean distance array in either an ascending order or a descending order for further processing.

The online system 140 determines a mean distance value for the distance array using a confidence interval. For example, a 95% confidence interval is generated by including all individual mean distance values of the mean distance array that remain after discarding the highest and lowest 5% values of the mean distance array to determine a range of values that one can be 95% certain to contain the true mean distance value. A 95% confidence interval roughly equates to two standard deviations.

In one embodiment, the online system 140 estimates a lift in the foot traffic at the store by computing a difference between the mean distance value for the lifted distance array and the mean distance value for the base distance array, where the mean distance value difference represents a measure of the increase in the number of users visiting the store in response to receiving the advertisement. Because mean distance value of a distance between the store location and the users' location is an indirect measure of the number of visitors to the store, any decrease in the mean distance value from the base group of users to the lifted group of users represents an increase in the number of users visiting the stores in response to receiving advertisements associated with the store.

In one embodiment, the online system 140 estimates a lift in foot traffic for each of the frequent reporting group of users and the infrequent reporting group of users, where the lift estimating process for each group of users is same as the example process described above with reference to FIG. 4. For example, the online system 140 estimates a lift in the foot traffic at the store for each of the frequent reporting group of users and the infrequent reporting group of users by computing a difference between the mean distance value for the lifted distance array and the mean distance value for the base distance array corresponding to each group, where the mean distance value difference represents a measure of the increase in the number of users visiting the store in response to receiving the advertisement.

Statistical analysis such as a proportion test and Z-score computation, as described above with reference to FIG. 3, can be performed on the base group of users and the lifted group of users to estimate whether any reduction in the mean distance value observed with the lifted group is statistically significant. The actual visitors to the store will comprise users that belong to either the frequent reporting group or the infrequent reporting group. The proportion test analysis and Z-score computation can be repeated for each of the frequent reporting group and infrequent reporting group, and individual Z-scores can be combined using Stouffer's weighted Z-score method.

Example Estimation of Foot Traffic Lift at a Store in Response to Advertisement Campaign at an Online System FIGS. 5A through 5D shows an example estimation of foot traffic lift at a store in response to advertisement campaign at an online system, in accordance with an embodiment. Each of the FIGS. 5A-5D show a representation of a number of reported users in the vicinity of a store as a function of a distance of the user's closest location to the physical location of the store. The X-axis of each of FIGS. 5A-5D represents a distance between the store location and the user's closest reported location to the store's location.

The Y-axis of each of FIGS. 5A-5D represents a number of reported users at a given distance from the store's physical location.

Figure 5A:
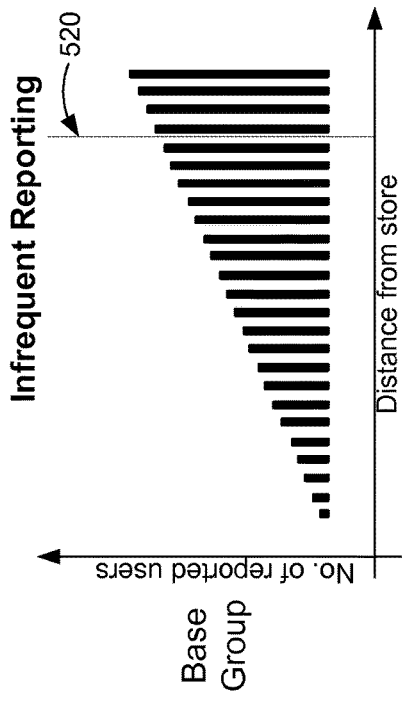
FIGS. 5A-5D show example estimation of foot traffic lift at a store in response to advertisement campaign at an online system, in accordance with an embodiment.
Figure 5B:
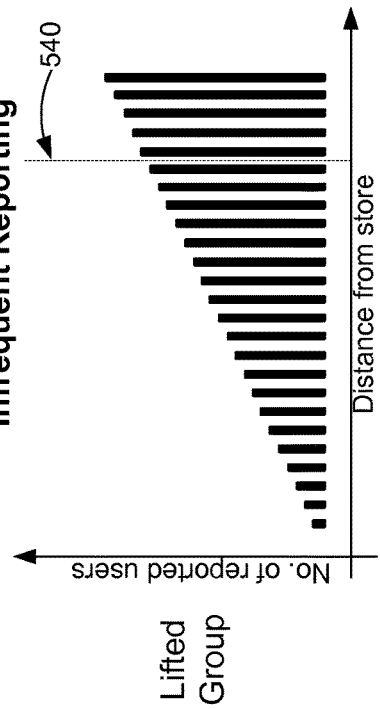
Figure 5C:
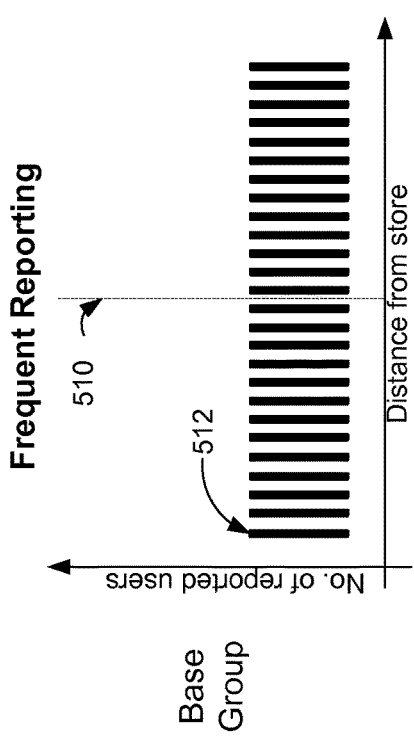

FIGS. 5A and 5C show a representation of the number of reported users, where the users belong to the frequent reporting group. FIG. 5A shows number of reported users for a base group of users within the frequent reporting group, and FIG. 5C shows number of reported users for a lifted group of users within the frequent reporting group. Line 510 represents a mean distance value for the base group of users of FIG. 5A generated using the exemplary method described above with reference to FIG. 4. For an example data set, the mean distance value 510 is 260 meters. The lifted group of FIG. 5C includes additional visits by users as represented by a vertical bar 532 that is taller than the corresponding bar 512 of FIG. 5A at the same distance from store. After analyzing the location data for the example set of lifted group of users of FIG. 5C, the mean distance value 530 is 247 meters, which corresponds to a confidence interval of much higher than 95% (e.g., corresponding to about five standard deviations). In other words, there is a confidence level that is much larger than 95% that the true mean distance value of the total number of visitors in the lifted group of the frequent reporting group would be less than or equal to 247 meters. The decrease of in the mean distance value from the based group to the lifted group represents an increase in the visitors to the store in response to the advertisement campaign.

Figure 5D:
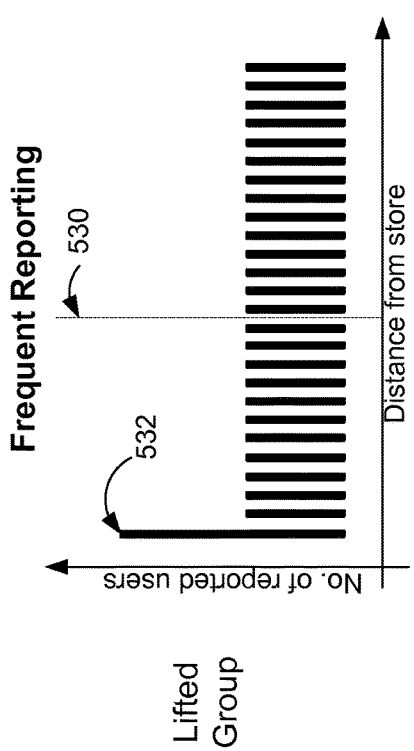

FIGS. 5B and 5D show a representation of the number of reported users, where the users belong to the infrequent reporting group. FIG. 5C shows number of reported users for a base group of users within the infrequent reporting group, and FIG. 5D shows number of reported users for a lifted group of users within the infrequent reporting group. Line 520 represents a mean distance value for the base group of users of FIG. 5C generated using the exemplary method described above with reference to FIG. 4. For an example data set, the mean distance value 530 is 340 meters. The lifted group of FIG. 5D includes additional visits even though the increased number of visits might not be seen easily seen by comparing the FIGS. 5C and 5D with a naked eye. But by analyzing the location data for the example set of lifted group of users of FIG. 5D, the mean distance value 540 is determined as 337 meters, which corresponds to a 95% confidence interval (e.g., corresponding to about two standard deviations). In other words, there is a 95% confidence that the true mean distance value of the total number of visitors in the lifted group of the infrequent reporting group would be less than or equal to 337 meters. The decrease in the mean distance value from the based group to the lifted group represents an increase in the visitors to the store in response to the advertisement campaign. As the delta between mean distance value from the base group to the lifted group increases, the number of users visiting the store also increases, which further increases a lift in the foot traffic in response to the advertisement campaign.

Additional Considerations

The foregoing description of the embodiments has been presented for the purpose of illustration; it is not intended to be exhaustive or to limit the patent rights to the precise forms disclosed. Persons skilled in the relevant art may appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which may be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   identifying a physical location for a store;
   defining an area around the physical location of the store, the area having an outer edge that is a set distance from the physical location;
   identifying, by an online system, a first population of users representing a lifted population that received a content item about the store;
   identifying, by the online system, a second population of users representing a base population of users who did not receive a content item about the store;
   periodically receiving and recording, by the online system, a report of a location of each of the users within the base population and the lifted population, the reported locations received from mobile applications on mobile devices of each of the users, wherein some of the reported locations are from users that belong to an infrequent reporting group that reports locations below a location reporting frequency threshold such that there are fewer reports of locations than for other users not belonging to the infrequent reporting group;

computing, for each user in the base population of users and the lifted population of users, a distance between the physical location of the store and the reported location of the user and for creating a base distance array corresponding to the base population of users and a lifted distance array corresponding to the lifted population of users, wherein, for users of the infrequent reporting group, the reported location used in the computation is an estimated actual closest location to the store based on a path of travel of each of those users through the defined area;

determining an aggregate value for each of the base distance array and the lifted distance array, the aggregate value representing a measure of a number of users visiting the store, wherein users are counted as having visited the store when the users have at least one of the reported locations within the defined area around the store or when the users have no reported locations within the defined area but have an estimated actual closest location within the defined area; and estimating a foot traffic lift for the store by comparing the aggregate value of the lifted distance array with the aggregate value of the base distance array, the estimated foot traffic lift representing a measure of an effect that receiving the content item had on whether or not users visited the store and a measure of an increase in a number of users visiting the store in response to receiving the content item.

2. The computer-implemented method of claim 1, wherein the store represents a brick-and-mortar business selling merchandise to users.

3. The computer-implemented method of claim 1, wherein the reported locations indicate current physical locations of the mobile devices of each of the users, wherein the reported locations are received from some of the mobile applications while they are running in the background on the mobile devices and from some of the mobile applications while they are running in the foreground on the mobile devices.

4. The computer-implemented method of claim 1, wherein periodically receiving and recording the report of the location of each of the users within the base population and the lifted population, the reported locations received from the mobile applications on mobile devices of each of the users comprises: periodically receiving and recording the report of the location from the mobile devices without input from the users of the mobile devices.

5. The computer-implemented method of claim 1, wherein determining the aggregate value for each of the base distance array and the lifted distance array comprises determining a mean distance value for each of the base distance array and the lifted distance array, the mean distance value corresponding to a distance array representing an average value of the distance between the physical location of the store and the location corresponding to each user of the distance array.

6. The computer-implemented method of claim 5, wherein estimating the foot traffic lift comprises computing a difference between the mean distance value for the lifted distance array and the mean distance value for the base distance array, the mean distance value difference representing a measure of the increase in the number of users visiting the store in response to receiving the content item.

7. The computer-implemented method of claim 5, wherein the mean distance value for each distance array is determined using bootstrapping with replacement statistical analysis.

8. The computer-implemented method of claim 7, wherein the bootstrapping with replacement statistical analysis comprises:

generating a first sample of the distance array by sampling the distance array, the first sample comprising a length N, the length N is smaller than a length of the distance array; and generating multiple distance sub-arrays by resampling the first sample, each distance sub-array comprising length N.

9. The computer-implemented method of claim 8, wherein the bootstrapping with replacement statistical analysis further comprises:

computing, for each of the multiple distance sub-arrays, a mean distance value;

generating a mean distance array comprising the mean distance values of the multiple distance sub-arrays; and ordering individual mean distance values of the mean distance array in an ascending order or a descending order.

10. The computer-implemented method of claim 9, wherein the bootstrapping with replacement statistical analysis further comprises:

determining a mean distance value for the distance array using a confidence interval.

11. A computer program product comprising a non-transitory computer-readable storage medium having instructions encoded thereon that, when executed by a processor, cause the processor to perform teps, the steps comprising:

identifying a physical location for a store;

defining an area around the physical location of the store, the area having an outer edge that is a set distance from the physical location;

identifying, by an online system, a first population of users representing a lifted population that received a content item about the store;

identifying, by the online system, a second population of users representing a base population of users who did not receive the content item about the store;

periodically receiving and recording, by the online system, a report of a location of each of the users within the base population and the lifted population, the reported locations received from mobile applications on mobile devices of each of the users, wherein some of the reported locations are from users that belong to an infrequent reporting group that reports locations below a location reporting frequency threshold such that there are fewer reports of locations than for other users not belonging to the infrequent reporting group;

computing, for each user in the base population of users and the lifted population of users, a distance between the physical location of the store and the reported location of the user and for creating a base distance array corresponding to the base population of users and a lifted distance array corresponding to the lifted population of users, wherein, for users of the infrequent reporting group, the reported location used in the computation is an estimated actual closest location to the store based on a path of travel of each of those users through the defined area;

determining an aggregate value for each of the base distance array and the lifted distance array, the aggregate value representing a measure of a number of users visiting the store, wherein users are counted as having visited the store when the users have at least one of the reported locations within the defined area around the store or when the users have no reported locations within the defined area but have an estimated actual closest location within the defined area; and estimating a foot traffic lift for the store by comparing the aggregate value of the lifted distance array with the aggregate value of the base distance array, the estimated foot traffic lift representing a measure of an effect that receiving the content item had on whether or not users visited the store and a measure of an increase in a number of users visiting the store in response to receiving the content item.

12. The computer program product of claim 11, wherein the reported locations indicate current physical locations of the mobile devices of each of the users, wherein the reported locations are received from some of the mobile applications while they are running in the background on the mobile devices and from some of the mobile applications while they are running in the foreground on the mobile devices.

13. The computer program product of claim 12, wherein periodically receiving and recording the report of the location of each of the users within the base opulation and the lifted population, the reported locations received from mobile applications on the mobile devices of each of the users comprises: periodically receiving location data from the mobile devices without input from the users of the mobile devices.

14. The computer program product of claim 11, wherein determining the aggregate value for each of the base distance array and the lifted distance array comprises determining a mean distance value for each of the base distance array and the lifted distance array, the mean distance value corresponding to a distance array representing an average value of the distance between the physical location of the store and location data corresponding to each user of the distance array.

15. The computer program product of claim 14, wherein estimating the foot traffic lift comprises computing a difference between the mean distance value for the lifted distance array and the mean distance value for the base distance array, the mean distance value difference representing a measure of the increase in the number of users visiting the store in response to receiving the content item.

16. The computer program product of claim 14, wherein the mean distance value for each distance array is determined using bootstrapping statistical analysis with replacement, the bootstrapping with replacement statistical analysis comprises:

generating a first sample of the distance array by sampling the distance array, the first sample comprising a length N, the length N is smaller than a length of the distance array; and generating multiple distance sub-arrays by resampling the first sample, each distance sub-array comprising length N.

17. The computer program product of claim 16, wherein the bootstrapping with replacement statistical analysis further comprises:

computing, for each of the multiple distance sub-arrays, a mean distance value;

generating a mean distance array comprising the mean distance values of the multiple distance sub-arrays;

ordering individual mean distance values of the mean distance array in an ascending order or a descending order; and determining a mean distance value for the distance array using a confidence interval.

18. A system for estimating foot traffic lift at a store comprising:

a processor; and a non-transitory computer-readable memory comprising instructions that when executed by the processor cause the processor to:

identify a physical location for a store;

define an area around the physical location of the store, the area having an outer edge that is a set distance from the physical location;

identify, by an online system, a first population of users representing a lifted population that received a content item about the store;

identify, by the online system, a second population of users representing a base population of users who did not receive a content item about the store;

periodically receive and record, by the online system, a report of a location of each of the users within the base population and the lifted population, the reported locations received from mobile applications on mobile devices of each of the users, wherein some of the reported locations are from users that belong to an infrequent reporting group that reports locations below a location reporting frequency threshold such than there are fewer reports of locations that for other users not belonging to the infrequent reporting group;

compute, for each user in the base population of users and the lifted population of users, a distance between the physical location of the store and the reported location of the user and for creating a base distance array corresponding to the base population of users and a lifted distance array corresponding to the lifted population of users, wherein, for users of the infrequent reporting group, the reported location used in the computation is an estimated actual closest location to the store based on a path of travel of each of those users through the defined area;

determine an aggregate value for each of the base distance array and the lifted distance array, the aggregate value representing a measure of a number of users visiting the store, wherein users are counted as having visited the store when the users have at least one of the reported locations within the defined area around the store or when the users have no reported locations within the defined area but have an estimated actual closest location within the defined area; and estimate a foot traffic lift for the store by comparing the aggregate value of the lifted distance array with the aggregate value of the base distance array, the estimated foot traffic lift representing a measure of an effect that receiving the content item had on whether or not users visited the store and a measure of an increase in a number of users visiting the store in response to receiving the content item.

19. The system of claim 18, wherein the instructions further cause the processor to determine the aggregate value for each of the base distance array and the lifted distance array is further configured to determine a mean distance value for each of the base distance array and the lifted distance array, the mean distance value corresponding to a distance array representing an average value of the distance between the physical location of the store and the location corresponding to each user of the distance array.

20. The system of claim 19, wherein the instructions further cause the processor to estimate the foot traffic lift is further configured to compute a difference between the mean distance value for the lifted distance array and the mean distance value for the base distance array, the mean distance value difference representing a measure of the increase in the number of users visiting the store in response to receiving the content item.

21. The system of claim 19, wherein the instructions further cause the processor to determine the mean distance value for each distance array using bootstrapping with replacement statistical analysis.

22. The system of claim 21, wherein the instructions to determine the mean distance value for each distance array using bootstrapping with replacement statistical analysis further cause the processor to:
generate a first sample of the distance array by sampling the distance array, the first sample comprising a length N, the length N is smaller than a length of the distance array; and
generate multiple distance sub-arrays by resampling the first sample, each distance sub-array comprising length N.

23. The system of claim 22, wherein the instructions to determine the mean distance value for each distance array using bootstrapping with replacement statistical analysis further cause to the processor to:
compute, for each of the multiple distance sub-arrays, a mean distance value;
generate a mean distance array comprising the mean distance values of the multiple distance sub-arrays; and
order individual mean distance values of the mean distance array in an ascending order or a descending order.

24. The system of claim 23, wherein the instructions to determine the mean distance value for each distance array using bootstrapping with replacement statistical analysis further cause to the processor:
determine a mean distance value for the distance array using a confidence interval.

25. The computer-implemented method of claim 1, wherein periodically receiving and recording, by the online system, a report of a location of each of the users within the base population and the lifted population, the reported locations received from mobile applications on mobile devices of each of the users comprises:
accessing one or more locations of the mobile device associated with each user from the mobile device; and
identifying, by the online system, an address corresponding to the one or more locations.

26. The computer-implemented method of claim 25, wherein
identifying, by the online system, an address corresponding to the one or more locations of the mobile device comprises:
periodically sampling locations of the mobile device associated with the user;
determining an address of the mobile device for each sampled location; and
aggregating the sampled locations based on the determined addresses.

27. The computer-implemented method of claim 1, wherein periodically receiving and recording, by the online system, a report of a location of each of the users within the base population and the lifted population, the reported locations received from mobile applications on mobile devices of each of the users further comprises:
recording a frequency at which each of the mobile devices report the location to the online system;
comparing the recorded frequency to a threshold frequency; and
separating the mobile devices into a group of devices with recorded frequencies above the threshold frequency that are not in the infrequent reporting group and a group of devices with recorded frequencies below the threshold frequency that are in the infrequent reporting group.

28. The computer-implemented method of claim 27, wherein the reported locations from the group of devices with recorded frequencies below the threshold frequency is collected based on one or more user interactions with the mobile application on the mobile device that indirectly indicate location of the user, the one or more user interactions including at least one interaction with an object stored within a social networking system, the at least one interaction represented as an edge between the user and the object within the social networking system.

29. The computer-implemented method of claim 1, wherein periodically receiving and recording, by the online system, the report of the location of each of the users within the base population and the lifted population, the reported locations received from mobile applications on mobile devices of each of the users comprises:
periodically receiving and recording, by the online system, the report of the location in response to an input provided by the user, the input providing an indication to share the location data of the mobile device of the user.

30. The computer program product of claim 11, wherein periodically receiving and recording, by the online system, the report of the location of each of the users within the base population and the lifted population, the reported locations received from mobile applications on mobile devices of each of the users comprises:
periodically receiving and recording, by the online system, the report of the location in response to an input provided by the user, the input providing an indication to share the location data of the mobile device of the user.

* * * * *

UNITED STATES PATENT AND TRADEMARK OFFICE
CERTIFICATE OF CORRECTION

PATENT NO. : 10,311,465 B2  
APPLICATION NO. : 14/742509  
DATED : June 4, 2019  
INVENTOR(S) : Maginnis It is certified that error appears in the above-identified patent and that said Letters Patent is hereby corrected as shown below:

In the Claims

In Column 22, Claim 11, Line 33, delete "teps," and insert -- steps, --, therefor.

In Column 23, Claim 13, Line 24, delete "opulation" and insert -- population --, therefor.

Signed and Sealed this
Twenty-ninth Day of October, 2019

Andrei Iancu
*Director of the United States Patent and Trademark Office*